United States Patent
Sugiyama et al.

(10) Patent No.: US 8,812,215 B2
(45) Date of Patent: Aug. 19, 2014

(54) FUEL INJECTION SYSTEM FOR INTERNAL COMBUSTION ENGINE

(75) Inventors: Kouichi Sugiyama, Chiryu (JP); Koji Ishizuka, Aichi-ken (JP)

(73) Assignee: Denso Corporation, Kariya (JP)

( * ) Notice: Subject to any disclaimer, the term of this patent is extended or adjusted under 35 U.S.C. 154(b) by 237 days.

(21) Appl. No.: 13/399,008

(22) Filed: Feb. 17, 2012

(65) Prior Publication Data

US 2012/0215422 A1 Aug. 23, 2012

(30) Foreign Application Priority Data

Feb. 18, 2011 (JP) ................................. 2011-033536

(51) Int. Cl.
*F02M 37/00* (2006.01)

(52) U.S. Cl.
USPC ........... 701/104; 123/446; 123/456; 123/457; 123/511

(58) Field of Classification Search
USPC ......... 123/445, 446, 447, 456, 457, 510, 511; 701/103, 104; 73/114.42
See application file for complete search history.

(56) References Cited

U.S. PATENT DOCUMENTS

| | | | |
|---|---|---|---|
| 5,058,553 A | 10/1991 | Kondo et al. | |
| 5,771,861 A * | 6/1998 | Musser et al. | 123/357 |
| 6,293,757 B1 | 9/2001 | Oda et al. | |
| 6,840,220 B2 * | 1/2005 | Yomogida et al. | 123/456 |
| 7,073,487 B1 * | 7/2006 | Oono | 123/457 |
| 8,210,155 B2 * | 7/2012 | Ohta et al. | 123/446 |

FOREIGN PATENT DOCUMENTS

| | | |
|---|---|---|
| EP | 0886058 | 12/1998 |
| JP | 2-146256 | 6/1990 |
| JP | 3-18645 | 1/1991 |
| JP | 3-18647 | 1/1991 |
| JP | 05-125973 | 5/1993 |
| JP | 6-207548 | 7/1994 |
| JP | 11-229924 | 8/1999 |
| JP | 11-315730 | 11/1999 |
| JP | 2001-254645 | 9/2001 |
| JP | 2007-113481 | 5/2007 |
| JP | 2009-299510 | 12/2009 |
| JP | 2010-190147 | 9/2010 |
| JP | 2010-270724 | 12/2010 |

* cited by examiner

*Primary Examiner* — Hai Huynh
(74) *Attorney, Agent, or Firm* — Nixon & Vanderhye P.C.

(57) ABSTRACT

A fuel injection system for an internal combustion engine is provided which calculates the quantity of fuel required to bring the pressure in a fuel accumulator into agreement with a target pressure and then control an operation of a high-pressure pump based on the required quantity. Even in the absence of a change in pressure in the accumulator, the system controls the high-pressure pump based on the required quantity. Specifically, the system calculates a feedback fuel quantity required to compensate for a difference between the required quantity and a quantity of the fuel actually supplied to the accumulator, in other words, leans such a quantity difference to correct the required quantity, thus resulting in an enhanced response of the system to control the high-pressure pump to a change in pressure in the accumulator.

5 Claims, 6 Drawing Sheets

FUEL INJECTION SYSTEM FOR INTERNAL COMBUSTION ENGINE

CROSS REFERENCE TO RELATED DOCUMENT

The present application claims the benefit of priority of Japanese Patent Application No. 2011-33536 filed on Feb. 18, 2011, the disclosure of which is incorporated herein by reference.

BACKGROUND

1. Technical Field

The present invention relates generally to a fuel injection system for internal combustion engines, and particularly to a common rail fuel injection system for diesel engines which may be employed in automotive vehicles.

2. Background Art

The common rail fuel injection system is mostly employed with diesel internal combustion engines for automotive vehicles. Specifically, the common rail fuel injection system is equipped with a high-pressure pump, a common rail, and fuel injectors. The high-pressure pump works to pressurize fuel, as fed from a fuel tank, and supplies it to the common rail. The common rail stores the fuel at a controlled pressure. The fuel injectors spray the fuel, as supplied from the common rail, into cylinders of the engine.

The common rail fuel injection system works to control the flow rate of fuel discharged from the high-pressure pump so as to bring the pressure of fuel in the common rail into agreement with a target pressure in a feedback mode using, for example, a proportional-integral-derivative (PID) algorithm. For example, Japanese Patent First Publication No. 2010-190147 discloses such pump discharge control. The target pressure is usually determined based on operating conditions of the engine such as a degree of load on and speed of the engine. The pressure in the common rail is detected using a pressure sensor.

The fuel injection system, as taught in the above publication, starts to control the operation of the high-pressure pump after a deviation of the pressure in the common rail from the target pressure occurs and, thus, faces a difficulty in controlling the high-pressure pump precisely and quickly in response to the pressure deviation. This may result in a high probability that when the target pressure changes with a change in operating condition of the engine, the actual pressure in the common rail overshoots the new target pressure or hunts around it.

SUMMARY

It is therefore an object to provide a fuel injection system designed to control an operation of a high-pressure pump so as to bring an actual pressure of fuel into agreement with a target pressure quickly and precisely.

According to one aspect of an embodiment, there is provided a fuel injection system which may be employed with an internal combustion engine for automotive vehicles. The fuel injection system is configured to supply fuel to the internal combustion engine and comprises: (a) a pump which pressurizes and feeds fuel, as stored in a fuel tank; (b) a fuel accumulator in which the fuel, as fed from the pump, is accumulated at a controlled pressure; (c) a fuel injector which works to spray the fuel, as stored in the fuel accumulator, to an internal combustion engine; (d) a pressure sensor which measures a pressure of the fuel in the fuel accumulator; and (d) a controller working to perform a required fuel quantity determining task, an actual fuel quantity determining task, a feedback quantity determining task, and a pump controlling task. The required fuel quantity determining task is to determine a quantity of fuel required to bring the pressure of the fuel in the fuel accumulator into agreement with a target pressure set as a function of an operating condition of the internal combustion engine. The actual fuel quantity determining task is to determine an actual quantity of the fuel which has been fed from the pump to the fuel accumulator. The feedback quantity determining task is to determine a feedback quantity that is a quantity of the fuel required to compensate for a difference between the required quantity of the fuel and the actual quantity of the fuel. The pump controlling task is to control an operation of the pump to discharge the fuel by an amount that is the sum of the required quantity and the feedback quantity.

Specifically, unlike the prior art system, as discussed in the introductory part of this application, the fuel injection system does not work to control the operation of the pump so as to compensate for the pressure difference between the target pressure and the actual pressure in the accumulator, but is engineered to determine the quantity of fuel required to bring the pressure in the accumulator into agreement with the target pressure and then drive the pump to feed the fuel by the determined quantity. This results in enhanced stability in bringing the actual pressure in the accumulator into agreement with the target pressure without overshooting or undershooting the target pressure.

Therefore, even when the target pressure changes with a change in operating condition of the internal combustion engine, the fuel injection system works to control the operation of the pump to have the pressure in the accumulator follow the target pressure quickly without overshooting or hunting of the actual pressure in the accumulator.

If a desired degree of ability of the pump is not obtained due to a production tolerance thereof or an error in calculating the required quantity of the fuel, a difference between the required quantity and the actual quantity will occur. The fuel injection system, thus, works to determine the value of the feedback quantity based on that difference to correct a target quantity of fuel to be fed to the accumulator so as to bring the pressure in the accumulator into agreement with the target pressure and then controls the operation of the pump so that the corrected target quantity of fuel is fed to the accumulator.

Each of the required quantity of the fuel and the actual quantity of the fuel has either of a positive value or a negative value. The quantity of fuel, as referred to in this application, may be expressed by a quantity of the fuel moving per unit time (i.e., a flow rate). For example, the required quantity and the actual quantity may be replaced with a total quantity of the fuel flowing intermittently or continuously for each fuel injection cycle of the fuel injector, each pumping cycle of the pump, or each operating cycle of the controller (i.e., the ECU 7 in the embodiment).

In the preferred mode of the embodiment, the fuel injector works to inject the fuel cyclically into the internal combustion engine. The required fuel quantity determining task determines the required quantity of fuel based on a quantity of the fuel to be injected by the fuel injector into the internal combustion engine in this injection cycle, a quantity of the fuel to be drained from the fuel injector without being sprayed into the internal combustion engine, and the difference between the required quantity of the fuel and the actual quantity of the fuel.

The injection cycle, as referred to herein, is a predetermined period of time after the required fuel quantity determining task starts to determine the required quantity. In the case of the internal combustion engine is a four-cycle reciprocating engine, the injection cycle is defined in a compression or an intake stroke of a piston of the engine.

Specifically, the fuel injection system estimates the quantity of fuel which will be drained from the accumulator by spraying of the fuel into the engine and then supplies the fuel to the accumulator through the pump. Therefore, as compared with the prior art system which starts to control the operation of the pump after the pressure difference occurs, the fuel injection system brings the actual pressure in the accumulator into agreement with the target pressure accurately, which ensures the stability in keeping the pressure in the accumulator at the target pressure.

The actual fuel quantity determining task may determine the actual quantity of the fuel based on a change in pressure of the fuel at an outlet of the pump for a given period of time and a quantity of the fuel having been sprayed from the fuel injector in the given period of time.

The fuel injection system may also include a pressure-reducing valve which works to reduce the pressure of the fuel in the accumulator when the required quantity of the fuel has a negative value. The fuel injection system is, therefore, permitted to activate only either of the pump or the pressure-reducing valve, thus avoiding unnecessary operations of the pump.

When the required quantity of the fuel has a value greater than or equal to zero, the pump controlling task instructs the pump to feed the fuel to the accumulator. The fuel injection system is, therefore, permitted to activate only either of the pump or the pressure-reducing valve, thus avoiding unnecessary operations of the pressure-reducing valve.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENTS

Figure 1A:
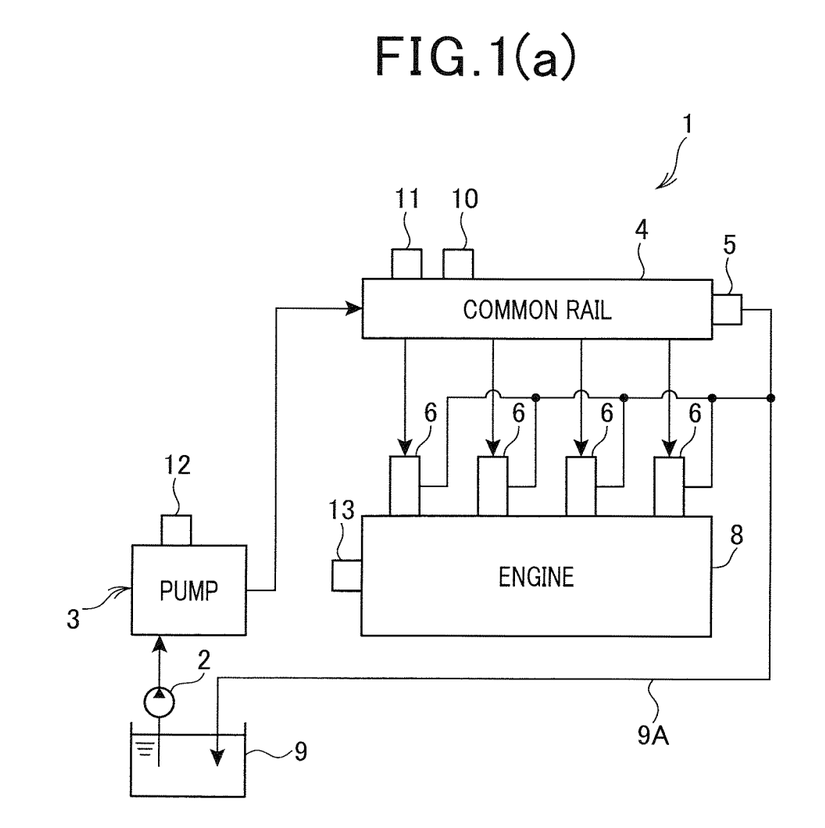
FIG. 1(a) is a block diagram which shows a fuel injection system according to an embodiment of the invention.
Figure 1B:
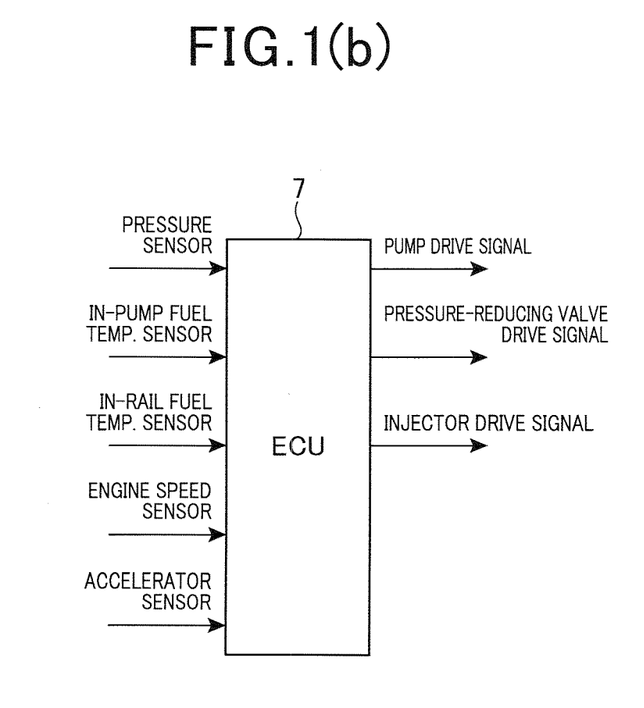
FIG. 1(b) is a block diagram which shows an electronic control unit of the fuel injection system of FIG. 1(a)

Referring to the drawings, wherein like reference numbers refer to like parts in several views, particularly to FIGS. 1(a) and 1(b), there is shown a fuel injection system 1 according to an embodiment of the invention which is designed control spraying of fuel to a four-cycle internal combustion diesel engine 8 for automotive vehicles.

1 Structure of Fuel Injection System

The fuel injection system 1 is of a common rail type and equipped with a feed pump 2, a high-pressure pump 3, a common rail 4 serving as a fuel accumulator, a pressure-reducing valve 5, fuel injectors 6, and an electronic control unit (ECU) 7 which drives the fuel injectors 6 (i.e., fuel injection valves) installed one in each of four cylinders of the diesel engine 8.

The feed pump 2 sucks fuel from a fuel tank 9 and feeds it to the high-pressure pump 3. The high-pressure pump 3 is, as illustrated in FIG. 2, equipped with a plunger 3A which is driven by an output of the engine 8 so that it reciprocates in synchronization with rotation of the engine 8 to suck, pressurize, and discharge the fuel cyclically.

Figure 2:
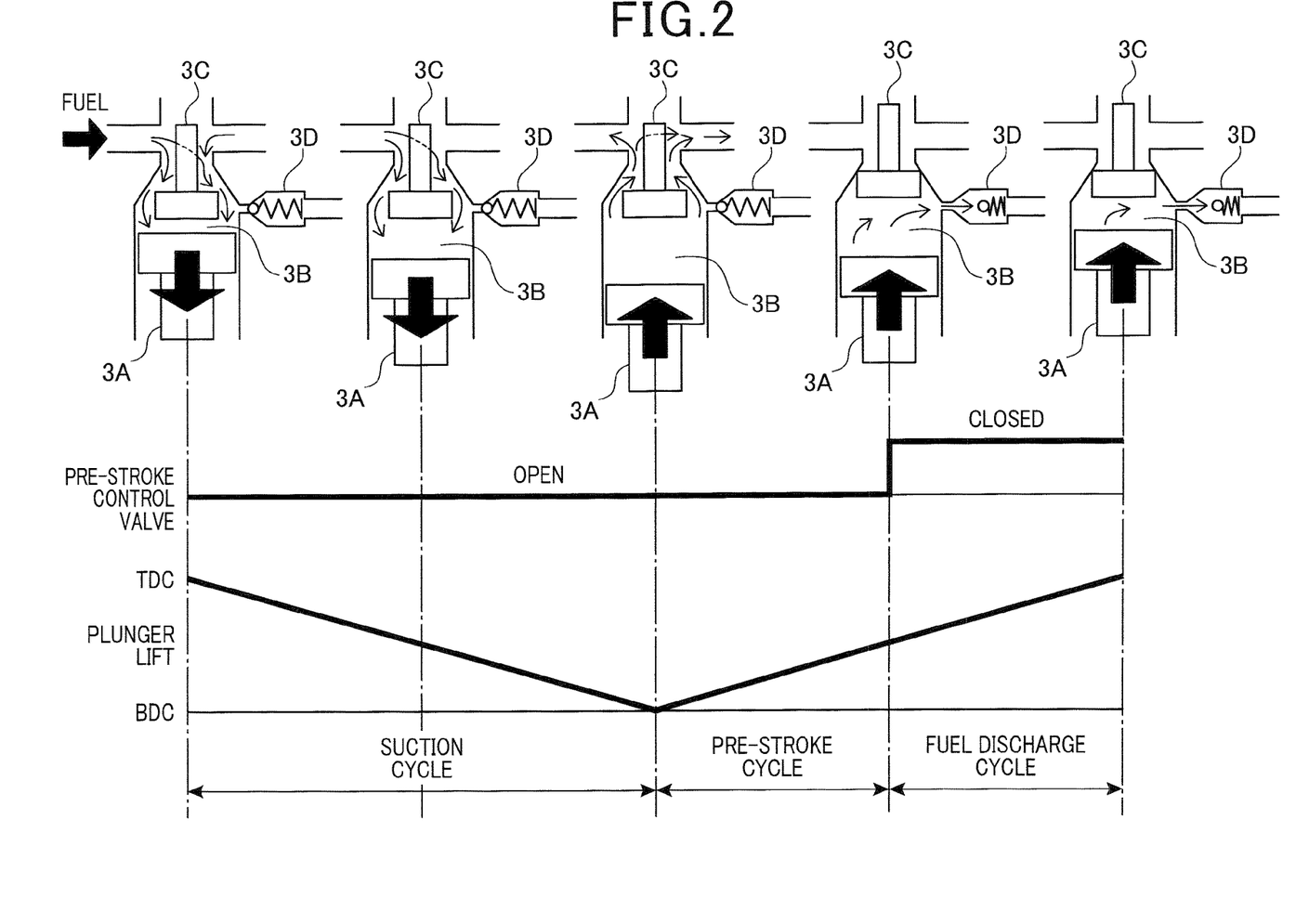
FIG. 2 is a schematic view which shows prestroke flow rate control in a high-pressure pump of the fuel injection system of FIG. 1(a)

The high-pressure pump 3 is, as illustrated in FIG. 2, also equipped with a pre-stroke control valve 3C which is installed in an inlet through which the fuel enters the high-pressure pump 3. The pre-stroke control valve 3C works as a flow rate control valve to control the amount of fuel sucked into a pressure chamber 3B. The opening or closing of the pre-stroke control valve 3C is controlled by the ECU 7. The high-pressure pump 3 is also equipped with a check valve 3D which is installed in the outlet thereof and allows the fuel to flow only out of the high-pressure pump 3.

When the plunger 3A moves from the top dead center to the bottom dead center with the pre-stroke control valve 3C opened, the volume of the pressure chamber 3B will increase, so that the fuel, as supplied from the feed pump 2, is sucked into the pressure chamber 3B (which will also be referred to as a suction cycle).

When the plunger 3A moves from the bottom dead center to the top dead center with the pre-stroke control valve 3C opened, the fuel, as sucked into the pressure chamber 3B, will flow backward to the fuel tank 9 through the pre-stroke control valve 3C (which will also be referred to as a prestroke cycle).

When a given time is reached, the pre-stroke control valve 3C is closed by the ECU 7. This causes the pressure, as remaining in the pressure chamber 3B, to be pressurized. When the pressure in the pressure chamber 3B exceeds that in the common rail 4, the fuel in the pressure chamber 3B will be fed to the common rail 4 through the check valve 3D (which will be referred to as a fuel discharge cycle).

The amount of fuel to be supplied from the high-pressure pump 3 to the common rail 4 is, therefore, determined by controlling the time when the pre-stroke control valve 3C is to be opened or closed. Specifically, when the pre-stroke control valve 3C is closed earlier, it will result in an increase in amount of fuel discharged to the common rail 4, while, when the pre-stroke control valve 3C is closed later, it will result in a decrease in amount of fuel discharged to the common rail 4.

The pre-stroke control valve 3C is implemented by a solenoid-operated valve, but may alternatively be designed to be driven by an actuator using a piezoelectric device.

The common rail 4, as illustrated in FIG. 1(a), constitutes a high-pressure fuel path leading to the outlet of the high-pressure pump 3 and also serves as a fuel accumulator in which the fuel, as fed from the high-pressure pump 3, is retained at a controlled pressure determined as a function of an operating condition of the engine 8. When opened, the pressure-reducing valve 5 drains the fuel from the common rail 4 to a low-pressure path 9A leading to the fuel tank 9 to reduce the pressure of fuel within the common rail 4.

The fuel injectors 6 are connected to the common rail 4 in parallel to each other and work as fuel injection valves to spray the fuel, as supplied from the common rail 4, to the cylinders of the engine 8, respectively. Each of the fuel injectors 6 is of a known solenoid-operated or piezo-driven type in which the pressure of fuel in a pressure chamber which urges a nozzle needle in a valve-closing direction to close a spray hole is controlled to spray a desired quantity of the fuel.

The pressure sensor 10 works to measure the pressure of fuel in the common rail 4. The common rail 4 also has a fuel temperature sensor 11 which measures the temperature of fuel in the common rail 4. Similarly, the high-pressure pump 3 has a fuel temperature sensor 12 which measures the temperature of fuel within the pressure chamber 3B of the high-pressure pump 3.

The fuel injection system 1 also includes an engine speed sensor 13 which measures the speed of rotation of the crankshaft of the engine 8 and an accelerator position sensor (not shown) which measures the position of an accelerator pedal (i.e., a driver's effort on the accelerator pedal). Outputs of the sensors 10 to 13 and the accelerator position sensor are, as illustrated in FIG. 1(b), inputted to the ECU 7.

The ECU 7 is implemented by a typical microcomputer equipped with a CPU, a ROM, a RAM, and a nonvolatile memory such as a flash memory and works to control the operations of the pre-stroke control valve 3C, the pressure-reducing valve 5, and the fuel injectors 6. A discharged pressure calculation/control program, as will be described later in detail, is stored in the ROM (i.e., the nonvolatile memory).

2 Control Operation of Fuel Injection System (ECU)
2.1 Pressure Control

The ECU 7 samples parameters, such as the speed of the engine 8 and the position of the accelerator pedal, which represent the operating conditions of the engine 8, and looks up a control map, as stored in the ROM, to determine the time (i.e., the injection timing) when each of the fuel injectors 6 is to be opened or closed and a target pressure Tp in the common rail 4. The ECU 7 then controls the opening or closing timing of the pre-stroke control valve 3C and the pressure-reducing valve 5 to bring the pressure in the common rail 4 into agreement with the target pressure Tp.

Specifically, the ECU 7 calculates the quantity of fuel (which will also be referred to as a required fuel quantity Qn below) required to be supplied to the common rail 4 in each fuel feeding cycle so as to bring the pressure in the common rail 4 into agreement with the target pressure Tp and measures the quantity of fuel (which will also be referred to as an actual fuel quantity Qr below) which has actually been fed from the high-pressure pump 3 to the common rail 4.

The ECU 7 then calculates the quantity of fuel (which will also be referred to as an F/B fuel quantity Qf below) required to bring the pressure in the common rail 4 into agreement with the target pressure Tp, in other words, bring the actual fuel quantity Qr into coincidence with the required fuel quantity Qn based on a difference between the required fuel quantity Qn and the actual fuel quantity Qr. The ECU 7 controls the on/off operations of the high-pressure pump 3, i.e., times when the pre-stroke control valve 3C is to be opened and closed, to discharge the fuel at a flow rate which achieves the sum of the required fuel quantity Qn and the F/B fuel quantity Qf.

Specifically, when the required fuel quantity Qn is greater than or equal to zero (0), the ECU 7 controls the operation of the pre-stroke control valve 3C to output the fuel from the high-pressure pump 3 by an amount that is the sum of the required fuel quantity Qn and the F/B fuel quantity Qf. Alternatively, when the required fuel quantity Qn is lower than zero, the ECU 7 keeps the pre-stroke control valve 3C opened to discharge no fuel from the high-pressure pump 3 and opens the pressure-reducing valve 5.

The ECU 7 works as a PID (Proportional-Integral-Derivative) controller to control the operations of the high-pressure pump 3 (i.e., the pre-stroke control valve 3C) and the pressure-reducing valve 5. The ECU 7 determines gains in the PID algorithm used to calculate the F/B fuel quantity Qf for the control of the high-pressure pump 3 (i.e., the pre-stroke control valve 3C) and gains used to calculate the F/B fuel quantity Qf for the control of the pressure-reducing valve 5 independently from each other.

The plunger 3A of the high-pressure pump 3, as described above, reciprocates synchronously with the speed of the engine 8, so that it moves up and down synchronously with reciprocating motion of pistons of the engine 8. The ECU 7, therefore, as demonstrated in FIG. 3, starts to calculate the required fuel quantity Qn and the actual fuel quantity Qr to control the operations of the high-pressure pump 3 and the pressure-reducing valve 5 each time the plunger 3A reaches the top dead center.

Figure 3:
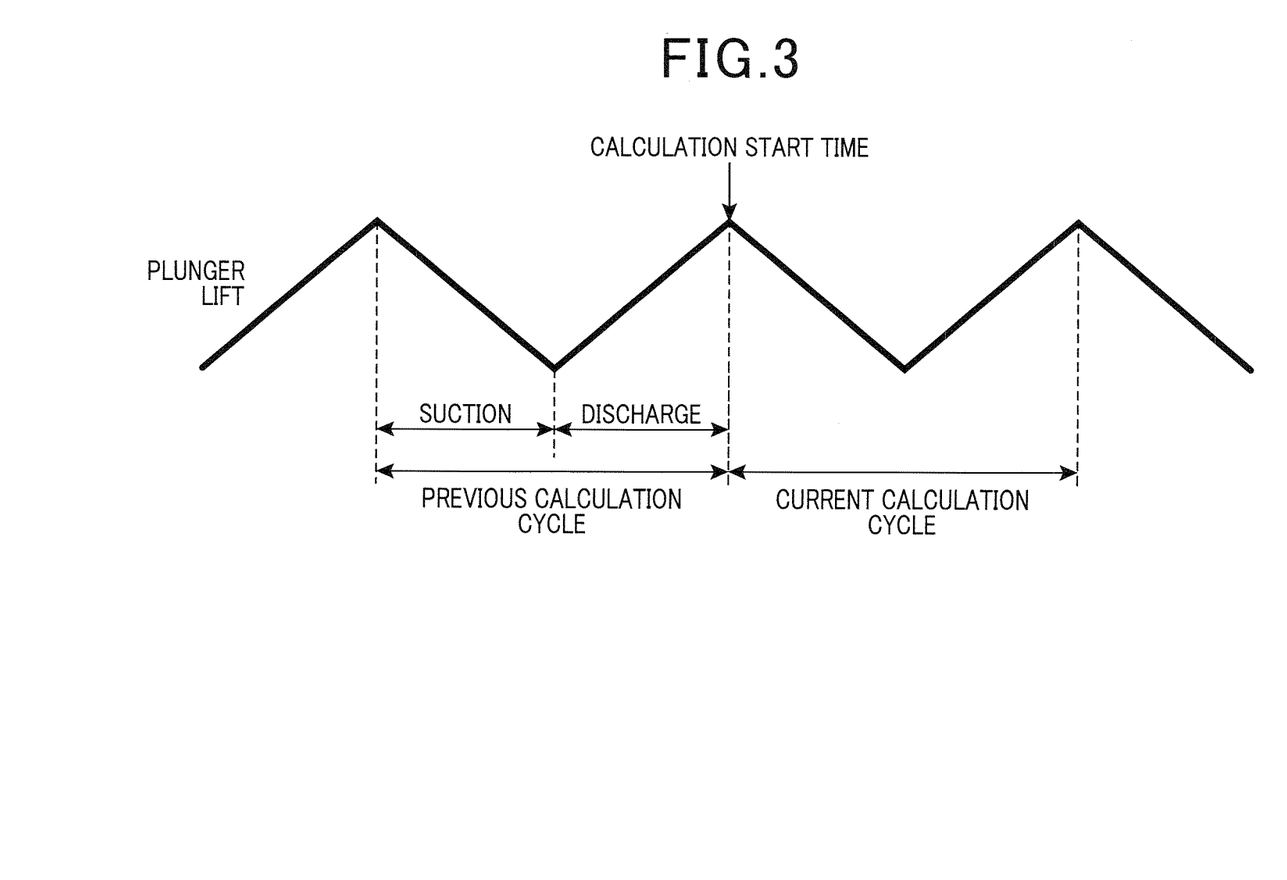
FIG. 3 is a time chart which demonstrates the time when a required quantity of fuel and an actual quantity of fuel start to be calculated.

Specifically, the ECU 7 completes the calculation of the required fuel quantity Qn and the actual fuel quantity Qr and then outputs a control signal (will also be referred to as a command signal below) to the high-pressure pump 3 (i.e., the pre-stroke control valve 3C) or the pressure-reducing valve 5 before start of a subsequent cycle of calculation of the required fuel quantity Qn and the actual fuel quantity Qr. Afterwards, when the plunger 3A reaches the top dead center, the ECU 7 starts to calculate the required fuel quantity Qn and the actual fuel quantity Qr again. In other words, each time the plunger 3A makes a round-trip, the ECU 7 makes the calculation of the required fuel quantity Qn and the actual fuel quantity Qr and outputs the control signal to operate the high-pressure pump 3 (i.e., the pre-stroke control valve 3C) or the pressure-reducing valve 5.

The required fuel quantity Qn and the actual fuel quantity Qr are expressed by the volume, not the mass and will change with a change in either of the temperature or pressure of the fuel. The required fuel quantity Qn and the actual fuel quantity Qr, as will be referred to below, are defined by the quantity of fuel in a reference condition, for example, where the temperature of the fuel is 40° C., and the pressure of the fuel is 1 atmosphere.

2.2 Calculation of Required Fuel Quantity Qn

Each of the fuel injectors 6 is controlled by the ECU 7 to inject the fuel into the engine 8 cyclically. The ECU 7 calculates the required fuel quantity Qn based on the quantity of fuel which is to be injected by the fuel injector 6 in this injection cycle, the quantity of fuel which is to drain from the fuel injector 6 in this injection cycle, and a pressure difference ΔP between the target pressure Tp and the pressure in the common rail 4, as measured by the pressure sensor 10.

Basically, a target quantity of fuel to be injected into the engine 8 in this injection cycle, as commanded by the control signal from the ECU 7, is substantially identical with the quantity of fuel the fuel injector 6 is instructed to spray in this injection cycle. However, when the target quantity of fuel is smaller than a predetermined minimum quantity, the ECU 7 instructs the fuel injector 6 to spray the minimum quantity of fuel in this injection cycle.

The quantity of fuel expected to drain from the fuel injector 6 in this injection cycle is calculated by look-up using a map, as stored in the ROM, which represents the drained quantity of fuel as a function of parameters such as the injection duration (i.e., the length of time the fuel injector 6 is kept opened), and the temperature and pressure of the fuel.

This injection cycle, as described above, is an interval, as illustrated in FIG. 3, between when the ECU 7 has started to calculate the required fuel quantity Qn, that is, the plunger 3A has reached the top dead center (which will also be referred to as a calculation start time below) and when the ECU 7 will subsequently start to calculate the required fuel quantity Qn. The quantity of fuel to be sprayed from each of the fuel injectors 6, that is, the target quantity of fuel, as commanded by the control signal outputted from the ECU 7 to the fuel injector 6, is determined in a known manner as a function of parameters representing the operating conditions of the engine 8.

The target pressure Tp is determined at the calculation start time. The pressure difference $\Delta P$ is given by a difference between the target pressure Tp and the pressure in the common rail 4, as measured by the pressure sensor 10 at the calculation start time.

When the calculated required fuel quantity Qn is greater than a maximum possible quantity that is the maximum capacity of the high-pressure pump 3, the ECU 7 sets the required fuel quantity Qn to the maximum possible quantity. Alternatively, when the calculated required fuel quantity Qn is lower than a minimum possible quantity that is the minimum capacity of the high-pressure pump 3, the ECU 7 determines the minimum possible quantity as the required fuel quantity Qn.

The maximum quantity and the minimum quantity which the high-pressure pump 3 is permitted to discharge depend upon the dimension (i.e., size) of the pressure chamber 3B, the quantity of fuel leaking from the pressure chamber 3B, and the dead volume of the fuel within the pressure chamber 3B. The leaking quantity of fuel and the dead volume usually change with a change in temperature or pressure of the fuel.

The dead volume is the volume of fuel inevitably remaining in the pressure chamber 3B after the fuel is fed by the plunger 3A to the common rail 4. The leaking quantity of fuel is the quantity of fuel escaping into a low-pressure pump chamber through a clearance between the plunger 3A and the cylinder in which the plunger 3A slides while the plunger 3A works to feed the fuel out of the high-pressure pump 3.

2.3 Calculation of Actual Fuel Quantity Qr

When the fuel is fed to the common rail 4, it will result in a rise in pressure of the fuel in the common rail 4. Conversely, when the fuel is discharged from the common rail 4, it will result in a drop in pressure of the fuel in the common rail 4. The ECU 7, therefore, calculates the actual fuel quantity Qr based on a change in pressure of the fuel at an outlet of the high-pressure pump 3 (i.e., a change in pressure in the common rail 4) for a given time interval and the quantity of fuel which has been sprayed from the fuel injector 6 for that time interval.

The above time interval, as referred to herein, is between the present calculation start time and the previous calculation start time, in other words, between when the plunger 3A has most recently reached the top dead center and when the plunger 3A reached the top dead center one stroke earlier. This time interval will also be referred to as a last calculation-to-calculation interval below. The change in pressure at which the fuel has been discharged from the high-pressure pump 3 during the last calculation-to-calculation interval is determined by a change in pressure in the common rail 4, as measured by the pressure sensor 10.

Basically, the ECU 7 determines the sum of the quantity of fuel (which will also be referred to as a target injection quantity or a commanded injection quantity below) the fuel injector 6 was instructed by the control signal outputted from the ECU 7 to spray in the last calculation-to-calculation interval and the quantity of fuel draining from the fuel injector 6 in the last calculation-to-calculation interval as the quantity of fuel which has been supplied to and sprayed from the fuel injector 6.

The quantity of fuel draining from the fuel injector 6, as referred to herein, is the sum of quantity of fuel leaking to a lower-pressure side of the fuel injector 6 through a clearance between the nozzle needle and an inner wall of the body of the fuel injector 6 along which the nozzle needle slides and quantity of fuel draining from the pressure chamber of the fuel injector 6 to a lower-pressure side to open the nozzle needle. In other words, it is the quantity of fuel not sprayed from the spray hole of the fuel injector 6.

However, when the target injection quantity is smaller than a predetermined minimum injection quantity, the ECU 7 determines the sum of the minimum injection quantity and the quantity of fuel draining from the fuel injector 6 in the previous injection cycle as the quantity of fuel which has been supplied to and sprayed from the fuel injector 6 in the previous injection cycle. The quantity of fuel draining from the fuel injector 6 usually changes with a change in injection duration (i.e., the length of time the fuel injection is kept opened), or the temperature or pressure of fuel.

2.4 Pressure Control Operation

Figure 4:
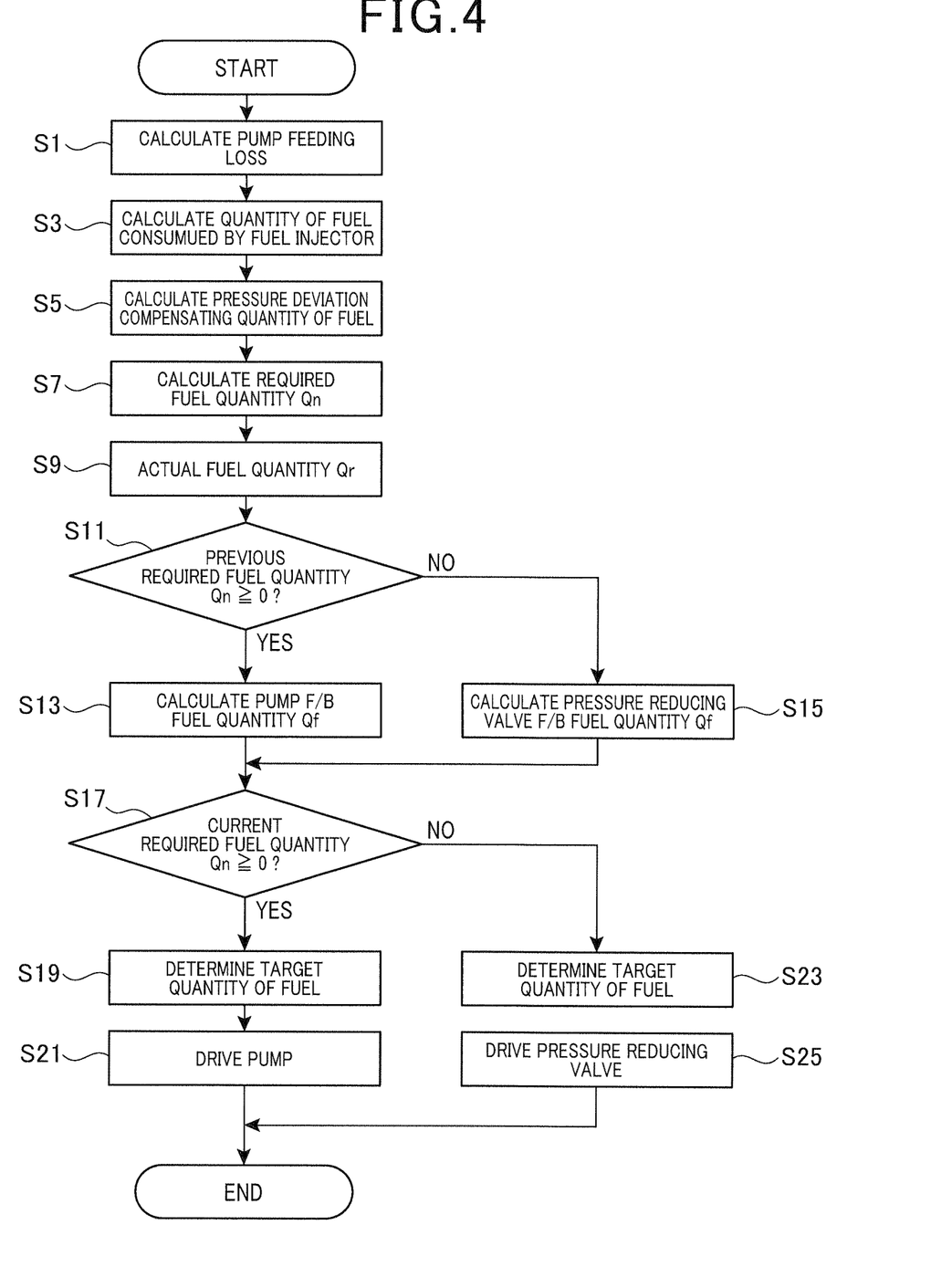
FIG. 4 is a flowchart of a pump control program to be executed by the electronic control unit of FIG. 1(b)

FIG. 4 is a flowchart of a sequence of logical steps or program to be executed by the ECU 7 to control the pressure in the common rail 4. This pressure control program is initiated each time the plunger 3A of the high-pressure pump 3 reaches the top dead center.

After entering the program, the routine proceeds to step wherein a pump feeding loss (i.e., the sum of the leaking quantity of fuel and the dead volume in the high-pressure pump 3, as described above) is calculated. The routine proceeds to step S3 wherein the quantity of fuel which will be consumed by the fuel injector 6 in this injection cycle, that is, the sum of quantity of fuel to be injected by the fuel injector 6 in this injection cycle and the quantity of fuel to be drained from the fuel injector 6 in this injection cycle, (i.e., the quantity of fuel consumed when the fuel injector 6 is opened) is calculated. The routine proceeds to step S5 wherein the quantity of fuel (which will also be referred to below as a pressure deviation compensating quantity) required to be fed to the common rail 4 in this injection cycle to compensate for the pressure difference $\Delta P$ between the target pressure Tp and the pressure in the common rail 4 in the reference condition is calculated.

The routine proceeds to step S7 wherein the pressure deviation compensating quantity, as derived in step S5, is added to the consumed quantity of fuel, as derived in step S3, to determine the required fuel quantity Qn (i.e., the quantity fuel required to be fed between when the ECU 7 has started to calculate the required fuel quantity Qn (i.e., the current calculation start time) and when the ECU 7 will subsequently start to calculate the required fuel quantity Qn). The routine proceeds to step S9 wherein the actual fuel quantity Qr in the last calculation-to-calculation interval is calculated.

The routine proceeds to step S11 wherein it is determined whether the required fuel quantity Qn, as calculated one program execution cycle earlier, is greater than or equal to zero or not. If a YES answer is obtained meaning that the previously calculated required fuel quantity Qn is greater than or equal to zero, then the routine proceeds to step S13 wherein a high-pressure pump feedback mode is entered. Specifically, the value of the F/B fuel quantity Qf for use in controlling the operation of the high-pressure pump 3 (i.e., the pre-stroke control valve 3C) is calculated. Alternatively, if a NO answer is obtained, then the routine proceeds to step S15 wherein a pressure-reducing valve feedback mode is entered. Specifically, the value of the F/B fuel quantity Qf for use in controlling the operation of the pressure-reducing valve 5 is calculated.

Specifically, when the previously calculated required fuel quantity Qn is determined to be greater than or equal to zero, the ECU 7 updates the value of the F/B fuel quantity Qf for use in controlling the operation of the high-pressure pump 3, while keeping the value of the F/B fuel quantity Qf, as derived in a previous program execution cycle, for use in controlling the operation of the pressure-reducing valve 5 as it is.

Alternatively, when the previously calculated required fuel quantity Qn is determined to be smaller than zero, the ECU 7 updates the value of the F/B fuel quantity Qf for use in controlling the operation of the pressure-reducing valve 5, while keeping the value of the F/B fuel quantity Qf, as derived in a previous program execution cycle, for use in controlling the operation of the high-pressure pump 3 as it is.

After either of the F/B fuel quantities Qf is updated, the routine proceeds to step S17 wherein it is determined whether the required fuel quantity Qn, as calculated in this program execution cycle, is greater than or equal to zero or not. If a YES answer is obtained meaning that the currently calculated required fuel quantity Qn is greater than or equal to zero, then the routine proceeds to step S19 wherein the high-pressure pump feedback mode is entered. Specifically, the value of the F/B fuel quantity Qf for use in controlling the operation of the high-pressure pump 3 (i.e., the pre-stroke control valve 3C) and the pump feeding loss, as derived in step S1 are added to the current required fuel quantity Qn to determine a target quantity of fuel to be discharged by the high-pressure pump 3 in the fuel feeding cycle. The routine then proceeds to step S21 wherein the ECU 7 instructs the high-pressure pump 3 to discharge the target quantity of fuel. However, when the target quantity is greater than the maximum possible quantity of fuel that is the maximum capacity of the high-pressure pump 3, the ECU 7, as already described, determines the maximum possible quantity as the target quantity of fuel.

Alternatively, if a NO answer is obtained in step S17, then the routine proceeds to step S23 wherein the pressure-reducing valve feedback mode is entered. Specifically, the value of the F/B fuel quantity Qf for use in controlling the operation of the pressure-reducing valve 5 is added to the current required fuel quantity Qn to determine the target quantity of fuel. The routine then proceeds to step S25 wherein the ECU 7 instructs the pressure-reducing valve 5 to drain the fuel from the common rail 4 by the target quantity. However, when the target quantity is greater than the maximum possible quantity of fuel that is the maximum capacity of the pressure-reducing valve 5, the ECU 7, as already described, determines the maximum possible quantity as the target quantity of fuel.

3. Feature of Fuel Injection System

Figure 5:
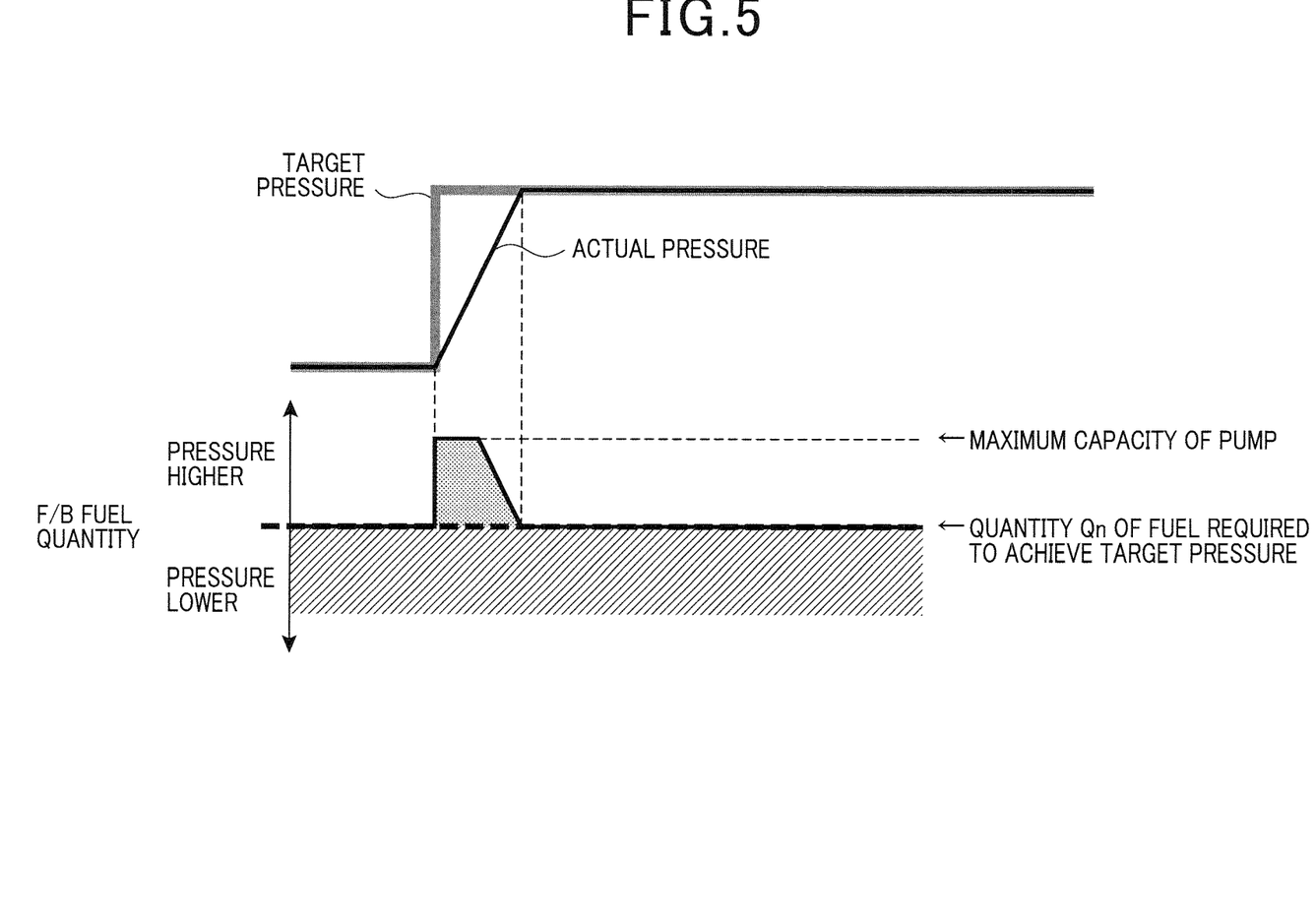
FIG. 5 is a time chart which demonstrates an operation of the fuel injection system of FIGS. 1(a) and 1(b) to control the pressure in a common rail.

Unlike the prior art system, as discussed in the introductory part of this application, the fuel injection system 1 does not work to control the operation of the high-pressure pump 3 so as to compensate for the pressure difference ΔP between the target pressure Tp and the actual pressure Pr, as measured by the pressure sensor 10, but is engineered to determine the quantity Qn of fuel required to bring the pressure in the common rail 4 into agreement with the target pressure Tp and then drive the high-pressure pump 3 to feed the fuel, as demonstrated in FIG. 5, by the determined quantity Qn. This results in enhanced stability in bringing the actual pressure Pr in the common rail 4 into agreement with the target pressure Tp without overshooting or undershooting the target pressure Tp.

Therefore, even when the target pressure Tp changes with a change in operating condition of the engine 8, the fuel injection system 1 works to control the operation of the high-pressure pump 3 to have the pressure in the common rail 4 follow the target pressure Tp quickly without overshooting or hunting of the actual pressure Pr in the common rail 4.

If a desired degree of ability of the high-pressure pump 3 is not obtained due to a production tolerance thereof or an error in calculating the required fuel quantity Qn, a difference between the required fuel quantity Qn and the actual fuel quantity Qr will occur. The fuel injection system 1, thus, works to determine the value of the F/B fuel quantity Qf so as to compensate for that difference, correct the target quantity of fuel required to bring the pressure in the common rail 4 into agreement with the target pressure Tp, and then control the operation of the high-pressure pump 3 so that the corrected target quantity of fuel is fed to the common rail 4.

Consequently, when there is the production tolerance of the high-pressure pump 3 or the error of the program in calculating the required fuel quantity Qn, the fuel injection system 1 learns it to determine the value of the F/B fuel quantity Qf and controls the high-pressure pump 3 using the F/B fuel quantity Qf in the feedback mode. When there is no production tolerance of the high-pressure pump 3 or the error of the program in calculating the required fuel quantity Qn, the F/B fuel quantity Qf will be almost zero.

Figure 6:
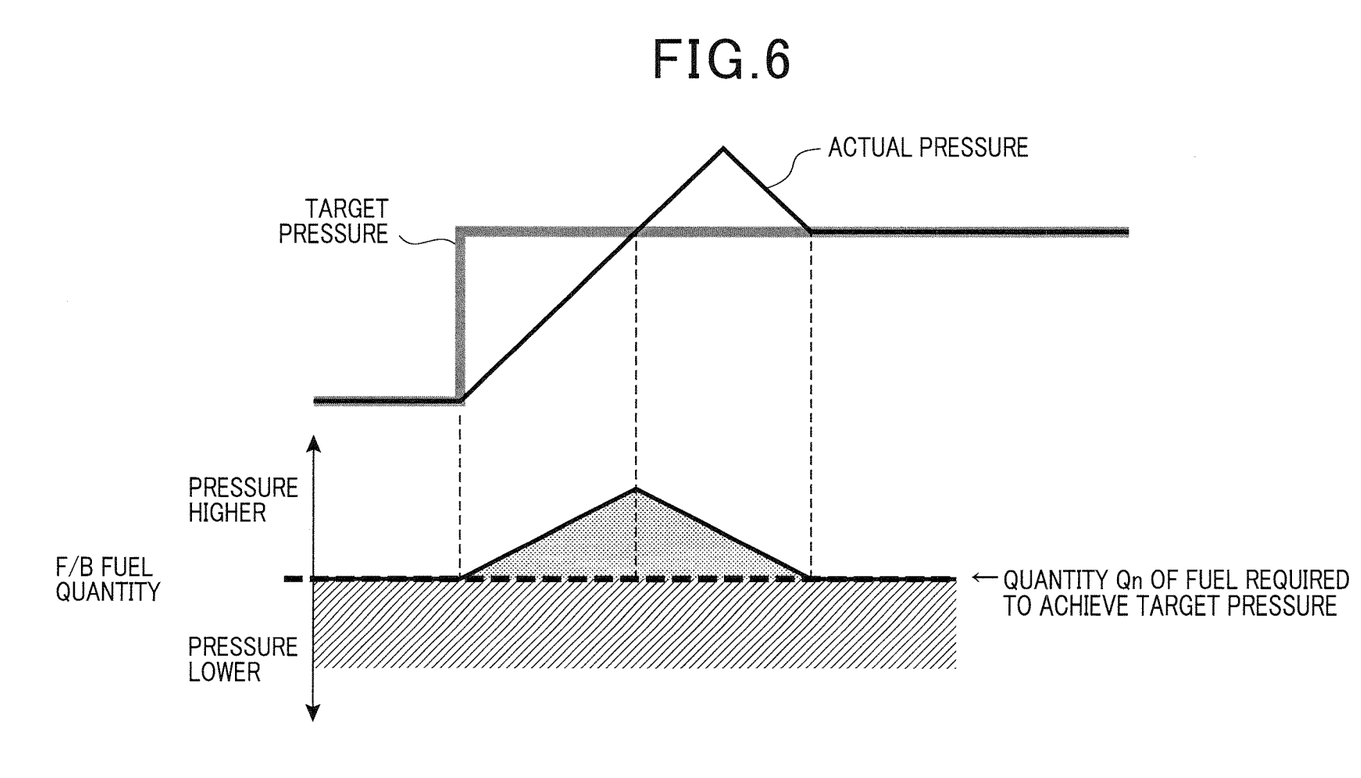
FIG. 6 is a time chart which demonstrates an operation of a prior art fuel injection system to control the pressure in a common rail.

FIG. 6 illustrates a comparative example of the prior art fuel injection system designed to control the quantity of fuel outputted by the high-pressure pump 3 so as to compensate for the pressure difference ΔP in the PID feedback mode. When the target pressure Tp continues to be greater than the actual pressure Pr, past errors will be accumulated, so that the integral value of the PID algorithm increases gradually to elevate the pressure of fuel in the common rail 4, thus causing the pressure of fuel to overshoot the target pressure Tp.

After the overshooting, the integral value decreases to reduce the pressure of fuel in the common rail 4, so that the actual pressure Pr converges on the target pressure Tp. The comparison between the examples of FIGS. 5 and 6 shows that the prior art fuel injection system consumes much time to have the actual pressure Pr reach the target pressure Tp and is inferior to the fuel injection system 1 of this embodiment in the feedback control accuracy.

The fuel injection system 1, as described above, determines the required fuel quantity Qn that is the quantity of fuel to be supplied to the common rail 4 in each pumping cycle of the high-pressure pump 3 based on the quantity of fuel which is to be injected by the fuel injector 6, the quantity of fuel which is to drain from the fuel injector 6, and the pressure difference ΔP between the target pressure Tp and the pressure in the common rail 4, as measured by the pressure sensor 10. In other words, the fuel injection system 1 estimates the quantity of fuel which will be drained from the common rail 4 by spraying of the fuel into the engine 8 and then supplies the fuel to the common rail 4 through the high-pressure pump 3. Therefore, as compared with the prior art system which starts to control the operation of the high-pressure pump 3 after the pressure difference ΔP occurs, the fuel injection system 1 brings the actual pressure Pr in the common rail 4 into agreement with the target pressure Tp accurately, which ensures the stability in keeping the pressure in the common rail 4 at the target pressure Tp.

When the required fuel quantity Qn has a negative value, the fuel injection system 1 opens the pressure-reducing valve 5 to decrease the pressure in the common rail 4 without activating the high-pressure pump 3. This avoids unnecessary operations of the high-pressure pump 3 and ensures quick convergence of the actual pressure Pr in the common rail 4 on the target pressure Tp.

Alternatively, when the required fuel quantity Qn has a positive value, the fuel injection system 1 activates the high-pressure pump 3 to supply the fuel to the common rail 4 without operating the pressure-reducing valve 5, thus avoiding unnecessary operations of the pressure-reducing valve 5 and ensuring quick convergence of the actual pressure Pr in the common rail 4 on the target pressure Tp.

Modifications

The fuel injection system 1, as discussed above, is used with the common rail type diesel engine 8, but however, may be designed for normal diesel engines or direct gasoline-injection engines.

The required fuel quantity Qn or the actual fuel quantity Qr may alternatively be determined in a manner other than as described above.

The fuel injection system 1 may be equipped with a relief valve instead of the pressure reducing valve 5. For example, a relief valve, as specified in Japanese Industrial Standards B 0125, No. 14-1, may be used to relieve an excessive pressure in the common rail 4.

The high-pressure pump 3 is of a prestroke adjustment type, but however, may be implemented by another type of pump.

The ECU 7, as described above, calculates the actual fuel quantity Qr based on a change in pressure at which the fuel has been discharged from the high-pressure pump 3 (i.e., a change in pressure in the common rail 4) for a given time interval and the quantity of fuel which has been sprayed from the fuel injector 6 for that time interval. The time interval is defined between the present calculation start time and the previous calculation start time, in other words, between when the plunger 3A has most recently reached the top dead center and when the plunger 3A reached the top dead center one stroke earlier, but may alternatively be set to another time length.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A fuel injection system which supplies fuel to an internal combustion engine, comprising:

a high-pressure pump which pressurizes and feeds fuel, as stored in a fuel tank;

a common rail which accumulates the high-pressure fuel, as fed from said high-pressure pump;

an injector which sprays and supplies the high-pressure fuel, as accumulated in the common rail, to the internal combustion engine;

a pressure sensor which detects a pressure in the common rail;

required flow rate determining means for determining a flow rate of the fuel required to bring the pressure in the common rail into agreement with a target pressure set as a function of an operating condition of the internal combustion engine;

actual flow rate detecting means for detecting an actual flow rate of the fuel which has been actually supplied from the high-pressure pump to the common rail;

F/B flow rate determining means for determining an F/B flow rate required to bring the pressure in the common rail into agreement with said target pressure based on a difference between the required flow rate of the fuel, as determined by said required flow rate determining means, and the actual flow rate, as detected by the actual flow rate detecting means; and pump controlling means for controlling said high-pressure pump so that a flow rate of the fuel that is the sum of the required flow rate and the F/B flow rate is discharged from the high-pressure pump.

2. A fuel injection system as set forth in claim 1, wherein said required flow rate determining means a quantity of the fuel which should be sprayed by the injector at this injection supplying time, a quantity of the fuel leaking in the injector at this injection supplying time, and a difference between the target pressure and the pressure, as detected by said pressure sensor.

3. A fuel injection system as set forth in claim 1, wherein said actual flow rate detecting means detects the actual flow rate based on a change in pressure at an outlet of said high-pressure pump which has occurred in a predetermined period of time and a quantity of the fuel which has been sprayed and supplied in the predetermined period of time.

4. A fuel injection system as set forth in claim 3, wherein said pressure-reducing means is provided which reduces the pressure in the common rail when the required flow rate of the fuel is a negative value.

5. A fuel injection system as set forth in claim 1, wherein when said required flow rate of the fuel becomes a value of zero or more, the pump controlling means instructs the high-pressure pump to discharge and supply the fuel to the common rail.

\* \* \* \* \*